Nov. 12, 1968
B. P. FUCHS
3,410,067
ASPARAGUS HARVESTER
Filed Aug. 4, 1965
3 Sheets-Sheet 3
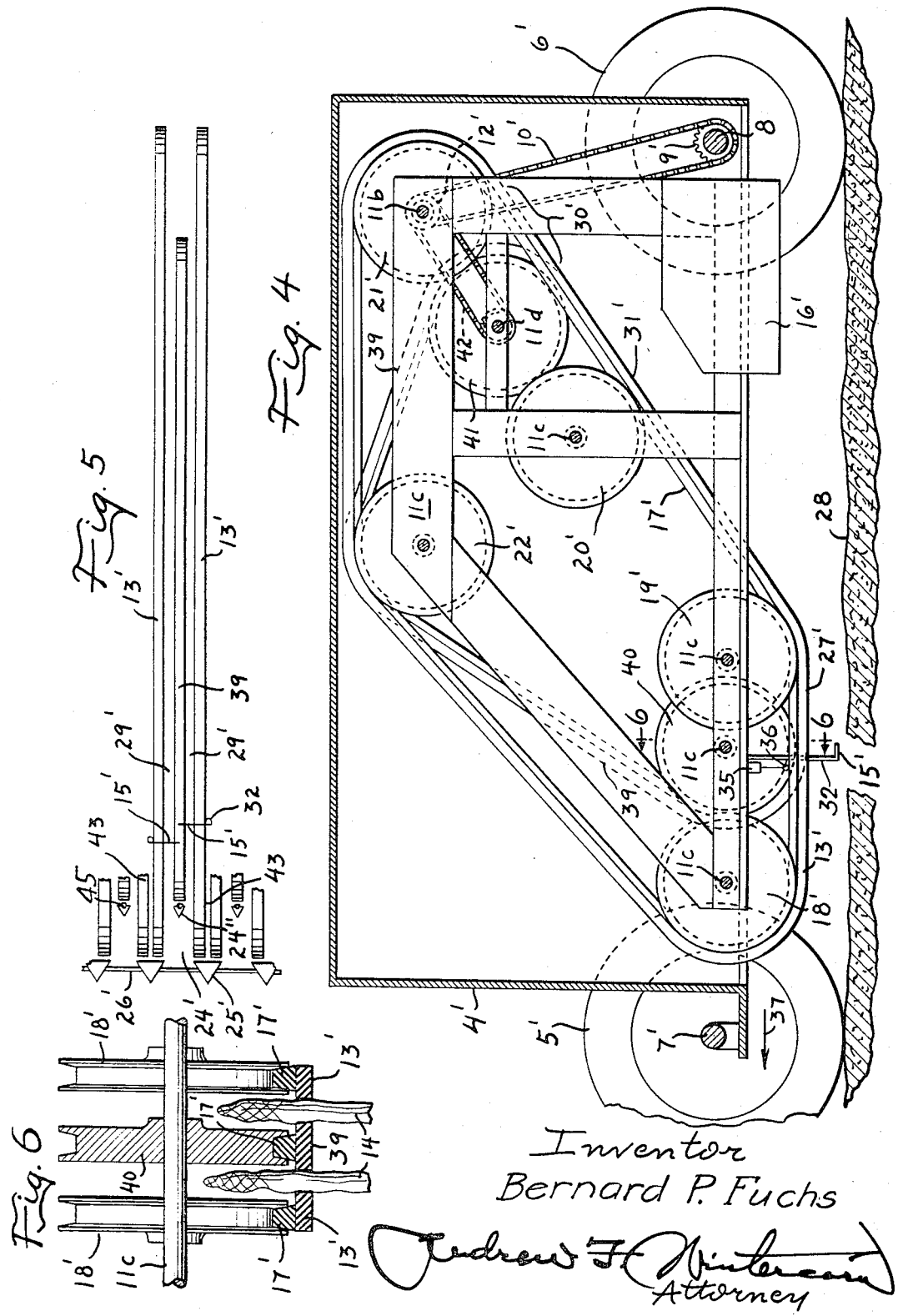
Inventor
Bernard P. Fuchs
Andrew F. Wintercorn
Attorney

United States Patent Office 3,410,067
Patented Nov. 12, 1968

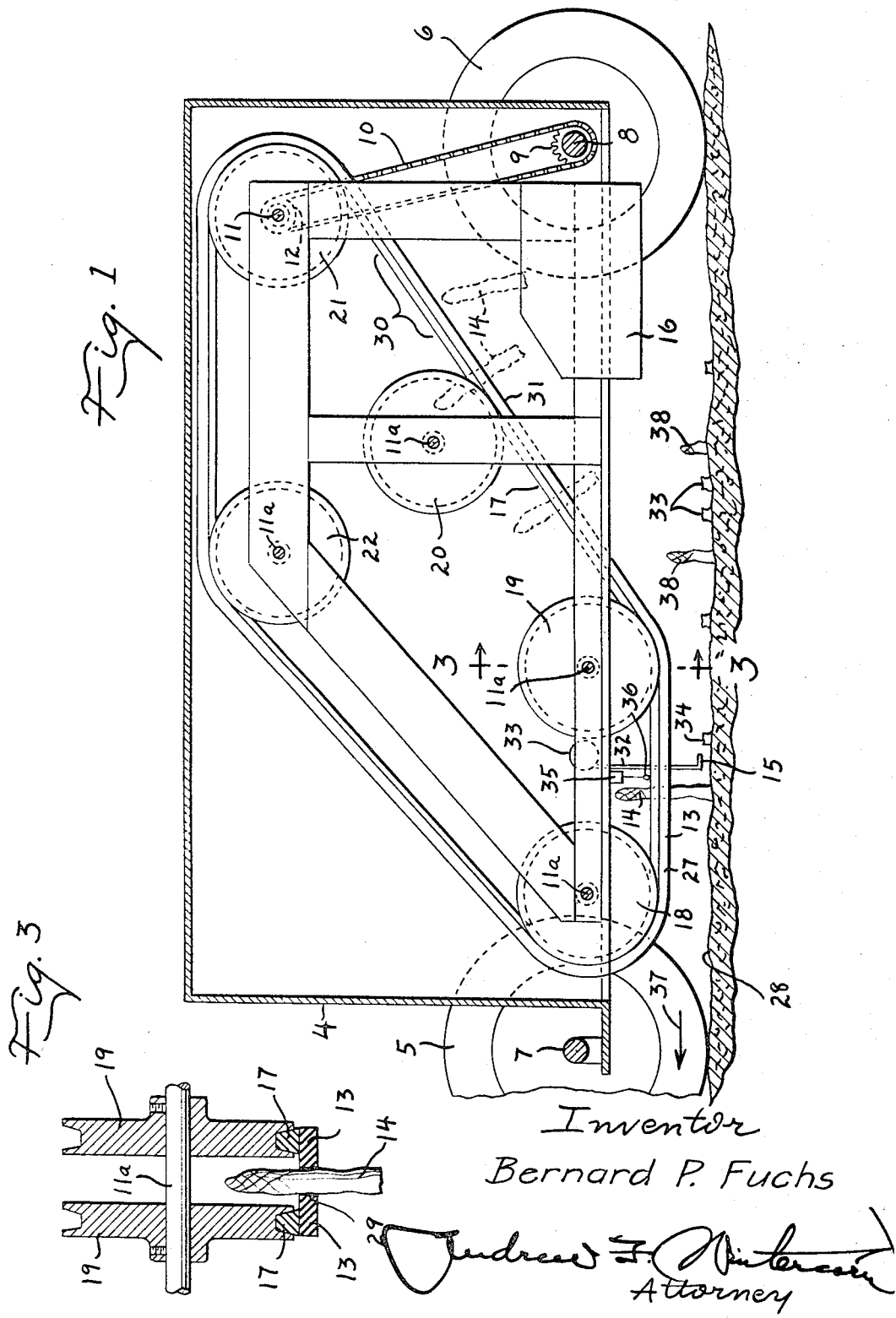

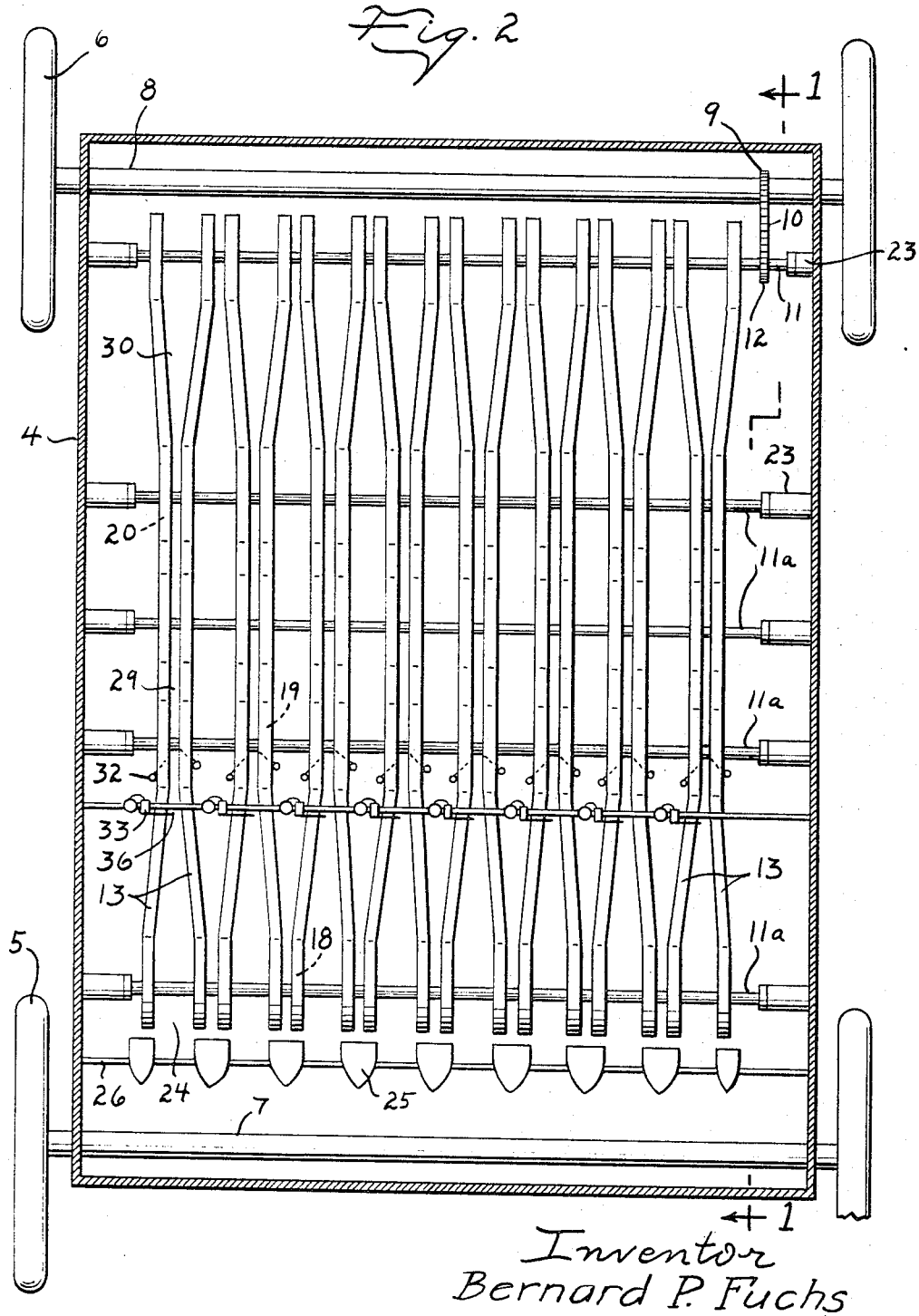

3,410,067
ASPARAGUS HARVESTER
Bernard P. Fuchs, R.R. 3, Rochelle, Ill. 61068
Filed Aug. 4, 1965, Ser. No. 477,110
13 Claims. (Cl. 56—327)

ABSTRACT OF THE DISCLOSURE

In this asparagus harvesting machine, the closely spaced endless belts employed have a horizontal flight at a predetermined elevation relative to the ground, depending on the length of spears to be cut, as these belts are designed to take hold on opposite sides of the spears that are long enough to be cut, and, after they are cut off at ground level, convey them upwardly to a drop-off point into a receptacle disposed therebelow. The soft rubber gripping portions of the belts that engage the spears do not harm them but hold them securely enough to prevent their dropping off. In one design, the belts operate in pairs and the guide pulleys for the belts are spaced farther apart at the entrance points and exit points than therebetween where the spears are taken hold of for the cutting and conveying. In a second design, three belts are used in each set, and the belts are parallel throughout, the middle belt of each set being shorter than the other two belts on opposite sides of it and having its front end spaced rearwardly relative to the others for the entrance, and having its rear end spaced forwardly relative to the others for the exit. In both designs the belts travel at the ground speed of the machine and are driven by a power take-off from an axle turning with the supporting wheels.

---

This invention relates to an asparagus harvesting machine.

Asparagus harvesting has thus far been done by hand, and mostly with imported labor, because American labor apparently regards it as too back-breaking and not sufficiently remunerative. However, it appears that legislation recently enacted prohibits importation of this labor and, hence, there is an immediate necessity for mechanization, but unfortunately, there are no successful machines available to do this work. It is, therefore, the principal object of my invention to provide an asparagus harvester of practical and useful design well adapted for the needs of this particular type of work, fully capable of singling out and severing only the spears that are seven inches long or longer, while leaving undisturbed and unharmed all spears that are of less than the predetermined length mentioned, so that these others may be harvested on the next pass through the bed the following day when they have attained the desired length.

A salient feature of the machine of my invention is the arrangement of soft rubber belts in spaced parallel relation carried on V-belts that run on pulleys, the soft rubber belts of each pair projecting laterally from their V-belts toward one another for contact with the spears on opposite sides, and the pulleys at the entrance end of the machine being widely spaced for easy entry of the spears between these soft rubber belts but the pulleys farther back being spaced closer together from the point where the spears are first grabbed and cut to the point where the cut spears are to be released and dropped, the belts travelling at ground speed and each spear of the requisite length engaging a feeler at its head end to trigger the operation of a cutter blade that cuts each spear off a predetermined distance above ground level. The blade projects horizontally from the lower end of a vertical shaft that is rotated by electrical solenoid means in response to the triggering of the feeler, so that the blade cuts only the spears of a predetermined length or longer and leaves undisturbed and unharmed all that are shorter, the cut spears being conveyed rearwardly and then upwardly on an incline to a drop zone in the rear portion of the machine, where the spears drop into a container or onto a conveyer belt. The spears drop through such a small distance and are so inclined in relation to the container or conveyer belt at the time of dropping so that there is no likelihood of any damage to the tender head ends as the tougher lower ends bear the brunt of the slight impact in landing in the container or on the conveyer belt. Also, due to the inclination of these spears at the point of dropping from the belt the head ends are always disposed in one direction, thereby facilitating the subsequent handling.

My novel arrangement of belts and pulleys is well adapted to the standard 30-inch width of asparagus beds as a bank of eight pairs of belts can easily harvest all spears seven inches and longer that are ready for harvesting, the eight pairs of belts covering the full width of the bed to take care of all of the harvesting in one pass, leaving for the next operation the following day all spears that are less than seven inches long and are not, therefore, grabbed between the belts and cut off near ground level. There are dividers disposed in front of the foremost pulleys for deflecting some spears to the right and others to the left into position for grabbing by the belts, so that no spears of sufficient length for harvesting will be missed.

In another form, in lieu of having each pair of related belts widely spaced at the entrances, where the spears enter and converging to the point where the spears are grabbed, I have the belts disposed in parallel relationship at all points but provide a third belt of shorter length midway between and in spaced parallel relation to the first mentioned belts, with or without a divider in front of the third belt in the entrance between the first named belts, the spears being grabbed between this third belt and each of the other two belts, and being cut by a pair of knives, one for each space between belts. This arrangement greatly reduces the extent to which spears have to be deflected laterally to the right or left to be grabbed between belts, and shorter cutter blades can be used, with less likelihood of cutting off or doing damage to any nearby spears left standing.

The invention is illustrated in the accompanying drawings, in which:

FIG. 1 is a longitudinal section through an asparagus harvester made in accordance with my invention, the view being taken on the line 1—1 of FIG. 2;

FIG. 2 is a top view of what is shown in FIG. 1, showing the frame of the machine in section;

FIG. 3 is a sectional detail on the line 3—3 of FIG. 1;

FIG. 4 is a longitudinal section through another form of the asparagus harvester made in accordance with my invention, using three belts in each set, as shown in the top view, FIG. 5, in lieu of two;

FIG. 5 is a top plan view of a portion of the modified device of FIG. 4, and

FIG. 6 is a sectional detail on the line 6—6 of FIG. 4.

Similar reference numerals are applied to corresponding parts throughout the views.

Referring first to FIGS. 1–3, the reference numeral 4 designates a generally rectangular frame that is wide enough to span a bed of asparagus and is supported on a pair of front wheels 5 and another pair of rear wheels 6. These wheels run in the furrows on opposite sides of the bed as the machine is either pulled or pushed along by means of a tractor or the like. Several machines may be run in a gang for harvesting asparagus from a number of rows at one time while using only one tractor to push or pull all of the machines, as it will be obvious from the present description that very little power is required to do this harvesting. The front wheels 5 are interconnected by an axle 7, and the rear wheels 6 are interconnected by another axle 8, the two axles being received in suitable bearings in frame 4. The rear axle 8 has a sprocket 9 over which a chain 10 runs to transmit drive to a cross-shaft 11 by means of another sprocket 12 on that shaft, and thus through this simple means drive is transmitted to all of the spear contacting belts 13 approximately at ground speed, there being two belts 13 of a soft or sponge rubber to engage each spear of the asparagus 14 from opposite sides and hold it just firmly enough to enable conveying it from the point of its being cut by rotation of a horizontal blade 15 to the point of dropping the spear later into a container 16 or onto a conveyor belt running transversely of the machine at the rear portion thereof. The soft rubber belts 13 are carried on V-belts 17 that run in pulleys 18–22 provided in five banks, four of which are at the four corners of a parallelogram, as seen at 18, 19, 21, and 22, the fifth bank of pulleys 20 being between the two banks of pulleys 19 and 21, and all five banks being mounted on parallel cross-shafts, the shaft 11 previously mentioned as being the driving shaft carrying the bank of pulleys 21, while all of the other four shafts 11a are idler shafts and carry the other banks of pulleys. The shafts 11 and 11a all are mounted in suitable bearings on the frame 4 as indicated at 23. The soft rubber belts 13 project laterally from the V-belts 17 toward one another as seen in FIG. 3 to have engagement on opposite sides of a spear and support the spear clear of the pulleys. The pulleys 18 for each pair of belts 13 are spaced relatively far apart as seen in FIG. 2 to enable easy entry of the spears of asparagus therebetween at 24, FIG. 2. Dividers 25 disposed between the neighboring pairs of belts 13 and their pulleys 18 are carried on a suitable cross-support 26 on frame 4 and serve to deflect some spears to the left and others to the right so that no spears of sufficient length for harvesting will be missed, the lowermost flight 27 of the belts 13 being spaced a little less than seven inches from the ground 28 so that only spears that are seven inches long or longer will be taken hold of by the belts 13 and harvested, all the rest being left untouched and unharmed for future harvesting the next day. Pulleys 19 are disposed much closer together than pulleys 18, as seen in FIG. 2, so as to define a much narrower passage 29 between the belts 13 so that they will maintain a good grip on the spears from the point of cutting, namely, in front of pulleys 19, to a point slightly beyond the pulleys 20, namely, in the drop zone 30 immediately above the container 16, or conveyor belt. The spears 14, which are disposed substantially at right angles to the belts 13 at the time of being cut by blade 15, remain substantially at right angles to the belts as they are carried upwardly and rearwardly on flight 31 to the drop zone 30 over container 16, or conveyor belt, as indicated by the dotted line showings of spears in FIG. 1, and it should be obvious that when the spears are released for dropping, being inclined forwardly, they will drop into place with the head ends forward, instead of being gathered in a hit or miss fashion in the container or on the belt, and consequently it simplifies matters considerably in the further handling of these spears. Also, it must be evident that since the cut spears drop with the cut end down, there is less likelihood of any damage being suffered by the tender head ends of the spears as the tougher lower ends bear the brunt of what little impact is involved in the short drop to which each spear is subjected.

Each horizontal cutting blade 15 is carried on the lower end of a vertical shaft 32, as seen in FIG. 1, that is suitably supported on the frame 4 with its operating solenoid 33. The latter when energized turns the shaft 32 through about 90° so that the blade 15, which normally projects rearwardly from the shaft 32, cuts the spear off at the lower end a short distance above the ground 28, as indicated at 34. A micro-switch 35 is associated with each solenoid 33 and is suitably mounted on the frame 4 and has a feeler 36 extending transversely of the space 29 between cooperating belts 13, as seen in FIG. 2, so as to be engaged by the head end portions of the spears and trigger the operation of the blade 15 to have the spears cut instantly upon deflection of the feelers 36, the feelers 36 being deflected out of the way by the spears after they are cut and resuming their former position immediately to trigger the next operation of the blades when the next spears come along.

In operation, the machine moves forward in the direction of the arrow 37, FIG. 1, and with eight pairs of belts 13 cooperating in the manner described above, all spears of a length seven inches or longer that occur in the thirty inch width of bed will be harvested, the shorter spears, like those indicated at 38 in FIG. 1, being passed without any damage being done to the tender head ends thereof, even if some of these spears are just long enough to reach between the belts 13 but not long enough to project upwardly beyond them and cause the triggering of the blades 15 by deflection of feelers 36. The cut spears are conveyed upwardly and rearwardly in flight 31 of the belts, as indicated in dotted lines in FIG. 1, and are finally released to drop into the container 16 or onto a conveyer belt at that same location in the rear portion of the frame 4. The blades 15 may be provided one per passage 29 or on opposite sides of each passage 29, so that shorter blades of about half the length required where only one blade per passage is provided may be used. The reason this is considered possibly necessary is that if the shafts 32 are provided on only one side of the passage the longer blades 15 needed to reach and cut spears whose lower ends are on the opposite side of the passage may cut off or damage too many short spears. When there are two blades 15 on two shafts 32 per passage, as shown in FIG. 2, the one shaft 32 and blade 15 may be set slightly in advance of the other blade 15 and shaft 32, and the forward blade be operated an instant before the other blade, the two shafts 32 being both preferably operated by a single solenoid 33 with the timed operation of the shafts taken care of in the drive gearing, so that only one feeler 36 is required per pair of blades to trigger their operation.

Referring to FIGS. 4, 5, and 6, this machine is similar to that shown in FIGS. 1 to 3 and corresponding parts are indicated by the same numbers, but with a prime or double prime or a letter. In lieu of having each pair of related belts 13' widely spaced at the entrances 24', where the spears enter, and converging to the point where the spears are grabbed, I have shown the belts 13' as disposed in parallel relationship at all points, and I provide a third belt 39 of shorter length midway between and in spaced parallel relation to the first mentioned belts, with or without a divider 24" in front of the third belt in the entrance 24' between the first named belts, (if dividers 24" are provided they must be suspended on vertical arms 45 from a horizontal cross-rod like 26') spears being grapped between the opposite sides of this third belt and the sides of the other two related belts 13', and being cut by a pair of knives 15', one provided for each of the spaces 29' between the belts. This requires only the addition of two more banks of pulleys 40 and 41 with additional pulleys 20' and 22' aligned with pulleys 40 and 41. Shaft 11d carrying drive pulleys 41 is shown as driven by a sprocket and sprocket chain connection 42 with shaft 11d, all of the other pulleys aligned with pulleys 41 being idlers. Belts 13', as seen in FIG. 6, are similar to the belts 13 seen in FIG. 3 and are carried on V-belts 17' in a similar way. Belt 39, however, grips spears 14 on both sides, as seen at FIG. 6, in cooperation with the two neighboring belts 13'. Belts 39 are mounted on and driven with other V-belts 17'. The spaces between the neighboring sets of three belts may be the same as at 29' or slightly smaller, as indicated at 43 in FIG. 5.

The operation of this machine is similar to the machine of FIGS. 1 to 3 but is better from the standpoint that it reduces the extent to which spears have to be deflected laterally to the right or left before being grabbed between belts, and the blades 15' can be shorter and there is accordingly less likelihood of cutting off or doing damage to any nearby short spears left standing, like those indicated at 38 in FIG. 1.

In conclusion, it should be understood that, in its broader concept, my invention consists in providing the generally parallelogram shaped guide structure in a vertical plane seen in FIG. 1 with spear gripping belts operating on the periphery thereof in pairs, as disclosed in FIG. 1, whereby to provide the horizontal flight of belts on the bottom of the parallelogram at a predetermined elevation with respect to the ground, where the spears are grabbed and cut, followed by an upwardly inclined flight of belts on the back of the parallelogram, where the freshly cut spears are conveyed upwardly to a suitable elevation before being dropped either into a container or onto a conveyer belt, the inclination of the spears during conveyance with the upwardly inclined flight of belts to the point of dropping being of advantage from the standpoint that the head ends are always disposed in one direction and there is less likelihood of damage being done to these spears when they land on their tougher lower ends in the container or on the conveyer belt.

It is believed the foregoing description conveys a good understanding of the objects and advantages of my invention. The appended claims have been drawn to cover all legitimate modifications and adaptations.

I claim:

1. In an asparagus harvester, the combination of a frame supporting therein a plurality of spaced parallel horizontal shafts, each shaft carrying a bank of coaxially arranged pulleys, drive belts running on said pulleys, the pulleys being in sets for each set of associated neighboring drive belts, asparagus gripper belts of softer material than said drive belts carried on and turning with said drive belts, the shafts and pulleys being arranged to define a substantially horizontal flight of gripper belts and also an upwardly inclined flight extending upwardly from the rear of the horizontal flight, supporting means carrying said frame for forward travel so that the horizontal flight of gripper belts is at a predetermined elevation with respect to the ground, means driving one of said shafts to operate said gripper belts substantially at the ground speed of said frame whereby the spears are gripped between the belts in the horizontal flight and remain so gripped as the machine moves forward, asparagus cutter means intermediate the ends of said horizontal flight whereby the cut spears are conveyed by the belts upwardly in the inclined flight to a point of release, and means below the upper end of the inclined flight to catch the cut spears when released.

2. An asparagus harvester as set forth in claim 1 wherein the gripper belts are wider than the drive belts and project laterally from the drive belts toward each other for engagement with opposite sides of a spear of asparagus.

3. An asparagus harvester as set forth in claim 1 wherein the supporting means comprises wheels running on the ground, and the means driving one of said shafts comprises a chain running over a pair of sprockets, one of which is fixed to the shaft, and the other turns with one of the supporting wheels.

4. An asparagus harvester as set forth in claim 1 wherein the asparagus cutter means for each pair of neighboring gripper belts comprises a substantially vertical shaft disposed alongside one of said belts and carrying a substantially horizontal blade on the lower end near ground level and swingable through about 90°, and power operable means for turning said shaft through about 90° set into operation by means contacting the head ends of spears reaching upwardly between the gripper belts.

5. An asparagus harvester as set forth in claim 1 wherein the asparagus cutter means for each pair of neighboring gripper belts comprises a substantially vertical shaft disposed alongside one of said belts and carrying a substantially horizontal blade on the lower end near ground level and swingable through about 90°, and power operable means for turning said shaft through about 90° set into operation by a feeler finger disposed immediately above and between neighboring gripper belts and arranged to be deflected by contact with the head ends of spears reaching upwardly between the belts, the finger operating a switch to close an electrical circuit through the power operable means.

6. An asparagus harvester as set forth in claim 1 wherein the asparagus cuter means for each pair of neighboring gripper belts comprises a pair of substantially vertical shafts disposed on opposite sides of said belts, each carrying a substantially horizontal blade on the lower end near ground level and swingable through about 90°, and power operable means for turning said shafts through about 90° set into operation by means contacting the head ends of spears reaching upwardly between the gripper belts.

7. An asparagus harvester as set forth in claim 1 including dividers carried on the front end of the frame and projecting forwardly from the front end of the horizontal flight of gripper belts, each divider being disposed between neighboring sets of gripper belts to deflect laterally standing spears disposed in the path of said dividers, some to the left and some to the right to be gripped by the gripper belts.

8. In an asparagus harvester, the combination of a frame supporting therein a plurality of spaced parallel horizontal shafts, each shaft carrying a bank of coaxially arranged pulleys, drive belts running on said pulleys, the pulleys being in sets for each set of associated neighboring drive belts, asparagus gripper belts of softer material than said drive belts carried on and turning with said drive belts, the shafts and pulleys being arranged to define a substantially horizontal flight of gripper belts and also an upwardly inclined flight extending upwardly from the rear of the horizontal flight, supporting means carrying said frame for forward travel so that the horizontal flight of gripper belts is at a predetermined elevation with respect to the ground, means driving one of said shafts to operate said gripper belts substantially at the ground speed of said frame whereby the spears are gripped between the belts in the horizontal flight and remain so gripped as the machine moves forward, each set of drive belts comprising three drive belts in spaced parallel relationship, the outer two belts being longer and having their pulleys at the front and rear ends disposed forwardly and rearwardly, respectively, relative to the pulleys at the front and rear ends of the shorter middle belt, the three gripper belts on the drive belts being of corresponding lengths, and the middle gripper belts projecting laterally both ways to cooperate with the laterally projecting portions of the two other gripper belts, the points of gripping and releasing being at the front and rear ends, respectively, of the middle gripper belts, asparagus cutter means intermediate the ends of said horizontal flight whereby the cut spears are conveyed by the belts upwardly in the inclined flight to a point of release, and means below the upper end of the inclined flight to catch the cut spears when released.

9. An asparagus harvester as set forth in claim 8 wherein the supporting means comprises wheels running on the ground, and the mean driving one of said shafts comprises a chain running over a pair of sprockets, one of which is fixed to the shaft, and the other turns with one of the supporting wheels.

10. In an asparagus harvester, the combination of a supporting frame, a generally parallelogram shaped guide structure for drive belts carried on said frame in a substantially vertical plane providing a horizontal lower portion at a predetermined elevation with respect to the ground and an upwardly inclined rear portion extending from the rear end of the horizontal lower portion, drive belts operating on the periphery of said guide structure so as to provide a horizontal flight at a predetermined elevation with respect to the ground extending into an upwardly inclined rear flight, drive means driving said belts, asparagus gripper belts of softer material than said drive belts carried on the periphery thereof and projecting laterally therefrom for gripping contact with opposite sides of standing spears of asparagus, means supporting said frame for forward travel at substantially the same ground speed at which said gripper belts operate, whereby the standing spears of asparagus are gripped between the belts in the horizontal flight and remain so gripped as the machine moves forward, asparagus cutter means intermediate the ends of the horizontal flight, whereby the cut spears are conveyed by the belts upwardly in the inclined flight to a point of release, and means below the inclined flight to catch the cut spears when released.

11. An asparagus harvester as set forth in claim 10 including dividers carried on the front end of the frame and projecting forwardly from the front end of the horizontal flight of gripper belts, each divider being disposed between neighboring pairs of gripper belts to deflect laterally standing spears disposed in the path of said divider, some to the left and some to the right, to be gripped between the gripper belts.

12. In an asparagus harvester, the combination of a supporting frame, a generally parallelogram shaped guide structure for drive belts carried on said frame in a substantially vertical plane providing a horizontal lower portion at a predetermined elevation with respect to the ground and an upwardly inclined rear portion extending from the rear end of the horizontal lower portion, drive belts operating on the periphery of said guide structure so as to provide a horizontal flight at a predetermined elevation with respect to the ground extending into an upwardly inclined rear flight, drive means driving said belts, asparagus gripper belts of softer material than said drive belts carried on the periphery thereof and projecting laterally therefrom for gripping contact with opposite sides of standing spears of asparagus, supporting means carrying said frame for forward travel substantially at the ground speed of operation of the gripper belts, whereby the standing spears of asparagus are gripped between the belts in the horizontal flight and remain so gripped as the machine moves forward, each set of drive belts comprising three drive belts in spaced parallel relationship, the outer two belts of each set being longer and having their front and rear ends disposed forwardly and rearwardly, respectively, relative to the front and rear ends of the shorter middle belt of the set, the three gripper belts on the drive belts being of corresponding length, and the middle gripper belts of each set projecting laterally both ways to cooperate with the laterally projecting portions of the two other gripper belts of the set, the points of gripping and releasing the spears being at the front and rear ends, respectively, of the middle gripper belts, asparagus cutter means intermediate the ends of the horizontal flight of belts, whereby the spears are conveyed by the belts upwardly in the inclined flight to a point of release, and means below the inclined flight to catch the cut spears when released.

13. An asparagus harvester as set forth in claim 12 including dividers carried on the front end of the frame and projecting forwardly from the front end of the horizontal flight of gripper belts, each divider being disposed between neighboring sets of gripper belts to deflect laterally standing spears disposed in the path of said dividers, some to the left and some to the right, to be gripped between the gripper belts, and other dividers carried on the frame in rearwardly spaced relation to the first-mentioned dividers projecting forwardly from the front end of the middle belt of each set of three drive belts to deflect laterally standing spears disposed in the path of said last-mentioned dividers, some to the left and some to the right, to be gripped between the middle belt and each of the other two belts of each set.

References Cited
UNITED STATES PATENTS

| | | | |
|---|---|---|---|
| 2,525,018 | 10/1950 | Corwin | 171—3 |
| 2,791,878 | 5/1957 | Kepner | 56—327 |
| 3,066,469 | 12/1962 | Chatagnier | 56—327 |
| 3,176,456 | 4/1965 | Franzen | 56—327 |

RUSSELL R. KINSEY, *Primary Examiner.*